3,073,752

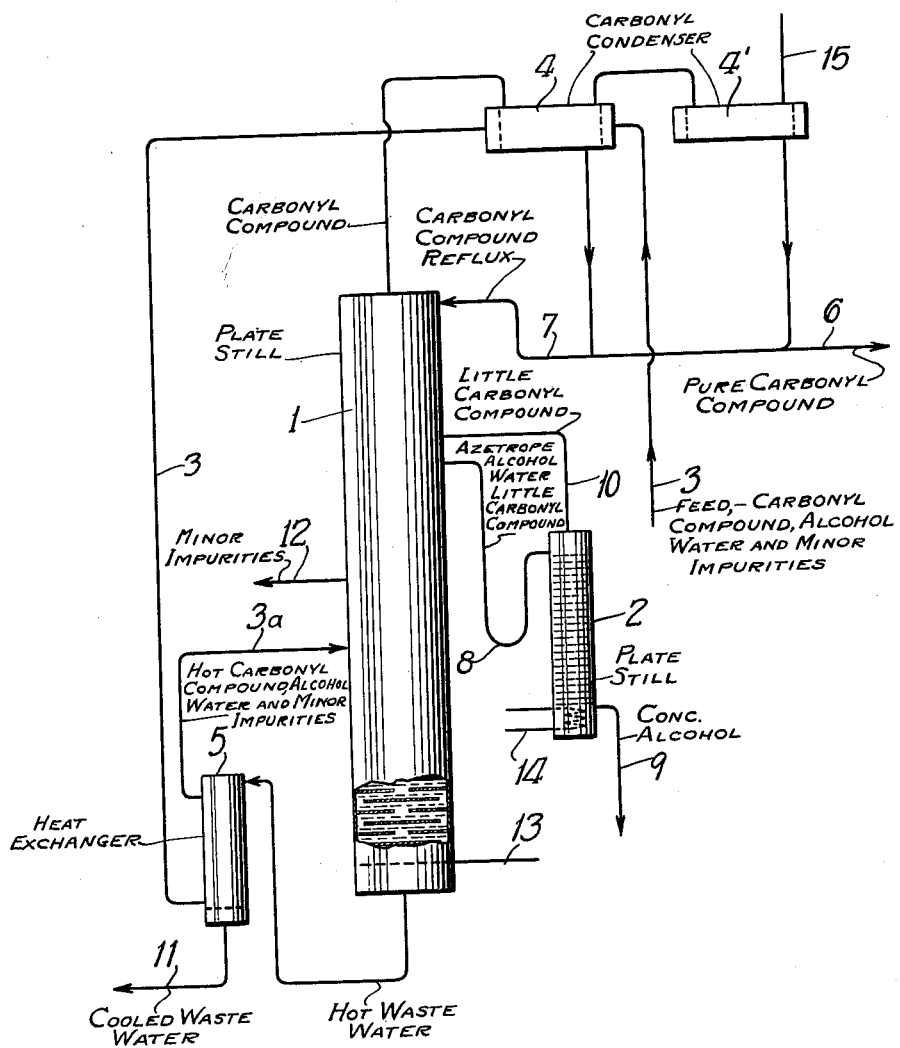

PROCESS FOR SEPARATING MIXTURES CONTAINING CARBONYL COMPOUNDS AND CORRESPONDING ALCOHOLS

Maurice Mention, Melle, France, assignor to Les Usines de Melle (Societe Anonyme), Saint-Leger-les-Melle, France, a corporation of France
Filed Nov. 25, 1957, Ser. No. 698,595
4 Claims. (Cl. 202—42)

This invention relates to a process for separating constituents of aqueous mixtures containing carbonyl compounds and the corresponding alcohols, and more particularly to such separation of lower carbonyl and alcohol compounds having at least two carbon atoms.

At the exit from the reaction furnaces producing aldehydes or ketones by oxidation or dehydrogenation of the corresponding lower aliphatic alcohols, there is always obtained a mixture of vapors and gases.

Such vapors are condensed as completely as possible by means of cooled surfaces, the condensate consisting essentially of carbonyl compound (aldehyde or ketone), unconverted starting alcohol, and water. The gases (hydrogen or a mixture of hydrogen and nitrogen) entrain large amounts of the carbonyl compound, the vapor pressure of which is high. It is necessary, therefore, to wash these gases for recovery of the carbonyl compound. Water is usually employed for this washing.

The mixture of the two liquids (viz., the condensate and the liquid resulting from the washing) thus consists of water, carbonyl compound, alcohol and by-products.

This mixture generally has been introduced into a first distilling column which has been so operated that pure aldehyde or ketone is obtained as a head product, while the mixture of water and corresponding alcohol free of such carbonyl compound has been withdrawn from the foot. This water-alcohol mixture has been fed to a second distilling column from which there has been obtained a water-alcohol azeotropic mixture as a head product and water as a tail product.

Of course, the liquid fed to the first column has been previously pre-heated by indirect heat exchange in the condenser of the second column and with the warm slops obtained at the base of the second column.

As the washing water constitutes a high proportion of the total liquid to be treated, the heat expanse in the two columns proportional to the amount of water withdrawn from the foot thereof, the amount of exhausting heat furnished for removing from the mixture either the carbonyl compound or the alcohol being completely sufficient, and even too high, to provide for operation of the concentration zones of the columns.

An object of this invention is to provide a more simple and economical process for carrying out this separation.

In accordance with my invention I distill a mixture consisting essentially of a carbonyl compound having at least two carbon atoms, the corresponding alcohol and water, so as to distill off substantially all the carbonyl compound and the alcohol and remove the major part of pure carbonyl compound at the top of the column, water and alcohol in at least azeotropic proportions from the side of the upper portion of the column, and waste water at the base. The carbonyl compound mentioned may be, for example, acetaldehyde or acetone. The corresponding alcohols therefore would be ethyl alcohol and isopropyl alcohol, respectively. I may treat other mixtures containing carbonyl compounds, such as for example propionaldehyde with its corresponding propyl alcohol. I may also treat methyl ethyl ketone with its corresponding alcohol, secondary butyl alcohol. The process is particularly adapted for the treatment of carbonyl compounds and alcohol of not over 6 carbon atoms each, herein designated as "lower" carbonyl compounds and alcohols. While withdrawing the carbonyl compound at the top of the column and water at the base, as stated above, I also, in accordance with my invention, withdraw alcohol, water, and a small amount of carbonyl compound from the column at a level at which the proportion of alcohol in the alcohol-water mixture is substantially that of the alcohol-water azeotropic mixture or is higher if it is contemplated to recover more concentrated alcohol or to dehydrate the recovered aqueous alcohol to produce absolute alcohol. I then feed the withdrawn liquid to the head part of a second distilling column and withdraw purified concentrated alcohol from the base of the second column. The small amount of carbonyl compound is removed from the head of the second column and is reintroduced into the first column, preferably at the same level at which said liquid was withdrawn.

The first distilling column is furnished at its base with an amount of heat sufficient to provide for removal of all the volatile products (alcohol and carbonyl compound) from the liquid. The heat expanse amounts approximately to that required for the second column in the conventional process.

From the head of the column there is obtained the aldehyde or ketone in pure condition owing to a strong reflux which takes place automatically due to the amount of exhausting heat.

By my process, the heat expanse required in the second column for removing the carbonyl compound from the alcohol is much lower than that required in the conventional process for removing the carbonyl compound from the water-alcohol mixture. This is obvious since the amount of exhausting heat is in direct ratio to the amount of liquid to be treated, and the amount of liquid is lower in the present process than in the conventional process.

The attached drawing illustrates an apparatus which may be used for carrying my invention into effect.

The mixture to be treated is introduced through pipe 3 and is pre-heated by indirect heat-exchange in condenser 4 and in heat-exchanger 5 which receives the hot spent wash from the base of plate column 1. Pipe 3a introduces the heated liquid to about the middle part of column 1. Column 1 is heated by injecting steam into its base through pipe 13, at a rate sufficient for separating all the carbonyl compound and alcohol from the bulk of water. From the top of the column, at the exit from condenser 4, and cooler 4′, pure aldehyde or ketone is withdrawn by pipe 6, a part of the condensing being refluxed by pipe 7 to the top of the column. From the side of the column, below the head part, concentrated alcohol containing small amounts of carbonyl compound is withdrawn by pipe 8. This alcohol is introduced into the head part of a little plate column 2, which is heated by steam passed through coil 14, and in this little column the alcohol is freed from carbonyl compound. Purified, concentrated alcohol is withdrawn by pipe 9 from the base of column 3. The vapors issuing from the top of column 2 are reintroduced by pipe 10 into column 1, at substantially the same level at which the alcohol has been withdrawn from column 1.

As compared with conventional processes, the process of my invention requires smaller apparatus and lower heat consumption.

Impurities such as acetic acid, high boiling products, formaldehyde, are removed in the spent wash water from the base of column 1. Other impurities, such as condensation products, may be withdrawn from the middle part of column 1, by a pipe 12 located between the feed (pipe 3) and the alcohol withdrawal (pipe 8).

Cooler 4′ is fitted with a vent 15 which may either open to the atmosphere or be connected with a pressure regulating device.

Example 1

An ethyl alcohol oxidation plant yielded per hour a raw reaction mixture having the following gross composition:

| | Kg. |
|---|---|
| Acetaldehyde | 1000 |
| Ethyl alcohol | 500 |
| Water | 6000 |
| Impurities | Minor amounts |

This mixture was treated in accordance with my process in an apparatus comprising a column 1 of 1300 millimetres diameter, having 50 plates, and a little column 2 of 500 millimetres diameter, having 15 plates. The apparatus was operated under a pressure of 2 kg./cm.² for increasing efficiency of the condensers, in view of the high volatility of the products to be condensed.

The mixture to be treated (at a temperature of about 20° C.) was passed by pipe 3 into condenser 4 in which it was brought to 38° C. by indirect heat exchange with the vapors of acetaldehyde distilling off from the top of column 1 (boiling point under the operating pressure=42° C.), then passed by pipe 3 through heat exchanger 5 in which it was brought to 90° C. by indirect heat exchange with the spent wash water from the base of column 1 which in the heat exchanger was cooled from 122° C. down to 45° C. This heating caused vaporization of 615 kg. acetaldehyde, 73 kg. ethyl alcohol and 61 kg. water.

The mixture of liquid and vapors at 90° C. was fed through 3a on to the fifteenth plate of column 1 which received at its base 1200 kg. per hour of steam injected through pipe 13.

1000 kg. per hour of pure acetaldehyde were withdrawn by pipe 6 from condensers 4 and 4′. From the thirty-fifth plate of the column there was withdrawn through pipe 8 about 840 kg. per hour of a mixture having the following composition:

| | Kg. |
|---|---|
| Ethyl alcohol | 700 |
| Acetaldehyde | 90 |
| Water | 50 |

This represents approximately an azeotropic proportion of water and alcohol.

This mixture was fed to column 2 which was heated at its base by 120 kg. per hour of steam. From the base of column 2, through pipe 9, there was withdrawn 540 kg. per hour of concentrated alcohol containing 500 kg. of ethyl alcohol and 40 kg. of water.

The spent wash water from column 1, after having served to pre-heat the initial mixture in exchanger 5, was discarded by pipe 11.

The total steam expense amounts to 1320 kg. per hour, instead of 2250 kg. per hour if the separation had been performed by the conventional process using two great columns. The price of the apparatus is lowered by 30% as compared with the conventional process.

Example 2

An isopropyl alcohol dehydrogenation plant yielded 3700 kg. per hour of a raw reaction mixture having the following gross composition:

| | Kg. |
|---|---|
| Acetone | 1500 |
| Isopropyl alcohol | 400 |
| Water | 1800 |
| Impurities | Minor amounts |

This mixture was treated in the apparatus of Example 1, but working at atmospheric pressure.

The mixture was preheated to 52° C. by the acetone vapors, then to 85° C. by the spent wash water from column 1 before entering column 1.

1500 kg. per hour of pure acetone were withdrawn by pipe 6. From the thirty-fifth plate of the column there was withdrawn 640 kg. per hour of a mixture consisting of:

| | Kg. |
|---|---|
| Isopropyl alcohol | 520 |
| Acetone | 60 |
| Water | 60 |

This represents approximately an azeotropic proportion of water and alcohol.

This mixture was fed to column 2 which was heated at its base by 100 kg. per hour of steam. From the top of column 2 acetone was fed back into column 1 through pipe 10. From the base of column 2 there was withdrawn 450 kg. per hour of a mixture containing 400 kg. isopropyl alcohol and 50 kg. water.

From the twentieth plate of column 1 there was withdrawn by pipe 12 small amounts of water-insoluble impurities (acetone oils).

The foregoing examples are illustrative, and the invention is not to be limited thereto except as may be indicated in the appended claims.

As stated, my invention may be used for treating other mixtures containing a carbonyl compound and the corresponding alcohol, each having at least two carbon atoms. More particularly, my process is suitable for treating reaction mixtures resulting from the manufacture of propionaldehyde from propyl alcohol or of methyl ethyl ketone from secondary butyl alcohol.

Though the foregoing disclosure is more particularly concerned with the treatment of mixtures obtained by oxidation or dehydrogenation of lower aliphatic alcohols, it is within the scope of my invention to treat mixtures having a similar qualitative composition but obtained from any other source.

I claim:

1. A process which comprises distilling in a column a mixture consisting essentially of a carbonyl compound having at least two carbon atoms, the corresponding alcohol and water, removing the major part of the carbonyl compound in a substantially pure state at the top of the column, withdrawing water at the base of the column, withdrawing from the column as a side stream a mixture of alcohol and water in at least azeotropic proportions with a minor proportion of said carbonyl compound with respect to the alcohol so withdrawn, feeding said withdrawn alcohol-water-carbonyl compound mixture to the head part of a second distilling column, withdrawing carbonyl compound vapor from the head of the second column and withdrawing purified concentrated alcohol from the base of the second column.

2. A process in accordance with claim 1, in which the carbonyl compound vapor from the head of the second column is returned to the first column near the side stream withdrawal point therefrom.

3. A process which comprises distilling in a column a mixture consisting essentially of acetaldehyde, ethyl alcohol and water, removing the major part of the acetaldehyde in a substantially pure state at the top of the column, withdrawing water at the base of the column, withdrawing from the column as a side stream a mixture of the alcohol and water in at least azeotropic proportions with a minor proportion of said acetaldehyde with respect to the alcohol so withdrawn, feeding said withdrawn alcohol, water and acetaldehyde to the head part of a second distilling column, withdrawing acetaldehyde vapor from the head of the second column and withdrawing purified concentrated ethyl alcohol from the base of the second column.

4. A process which comprises distilling in a column a mixture consisting essentially of acetone, isopropyl alcohol and water, removing the major part of the acetone in a substantially pure state at the top of the column, withdrawing water at the base of the column, withdrawing from the column as a side stream a mixture of the alcohol and water in at least azeotropic proportions with a minor proportion of said acetone with respect to the alcohol so withdrawn, feeding said withdrawn alcohol-water-acetone mixture to the head part of a second distilling column, withdrawing acetone vapor from the head of the second column and withdrawing purified concentrated isopropyl alcohol from the base of the second column.

References Cited in the file of this patent

UNITED STATES PATENTS

| | | |
|---|---|---|
| 2,080,194 | Barbet | May 11, 1937 |
| 2,118,834 | Boeckeler | May 31, 1938 |
| 2,392,534 | Von Keussler | Jan. 8, 1946 |
| 2,454,734 | Darlington | Nov. 23, 1948 |
| 2,510,806 | Egberts et al. | June 6, 1950 |
| 2,635,072 | Elliot | Apr. 14, 1953 |
| 2,640,017 | Graff | May 26, 1953 |
| 2,806,816 | Staib et al. | Sept. 17, 1957 |
| 2,828,249 | Maze-Sencier et al. | Mar. 25, 1958 |
| 2,944,087 | Nommensen et al. | July 5, 1960 |

FOREIGN PATENTS

| | | |
|---|---|---|
| 455,947 | Great Britain | Oct. 30, 1936 |

OTHER REFERENCES

Robinson: "Elements of Fractional Distillation," 1930, 2nd Edition (pages 167–169). Copy in Division 25.

UNITED STATES PATENT OFFICE
CERTIFICATE OF CORRECTION

Patent No. 3,073,752                          January 15, 1963

Maurice Mention

It is hereby certified that error appears in the above numbered patent requiring correction and that the said Letters Patent should read as corrected below.

Column 1, line 47, for "expanse" read -- expense --; line 48, after "columns" insert -- is --; line 60, after "of" insert -- the --; column 2, line 1, for "alcohol" read -- alcohols --; column 2, lines 22 and 29, for "expanse", each occurrence, read -- expense --; line 49, for "condensing" read -- condensate --; line 58, for "column 3" read -- column 2 --; column 3, line 18, after "increasing" insert -- the --.

Signed and sealed this 13th day of August 1963.

(SEAL)
Attest:

ERNEST W. SWIDER
Attesting Officer

DAVID L. LADD
Commissioner of Patents